United States Patent
Taniuchi

(10) Patent No.: US 10,350,925 B2
(45) Date of Patent: Jul. 16, 2019

(54) METHOD OF FORMING PATTERN, PATTERN-PRODUCING APPARATUS, AND STEREOSCOPIC OBJECT-PRODUCING APPARATUS

(71) Applicant: CANON KABUSHIKI KAISHA, Tokyo (JP)

(72) Inventor: Hiroshi Taniuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/545,162

(22) PCT Filed: Jan. 15, 2016

(86) PCT No.: PCT/JP2016/000198
§ 371 (c)(1),
(2) Date: Jul. 20, 2017

(87) PCT Pub. No.: WO2016/117318
PCT Pub. Date: Jul. 28, 2016

(65) Prior Publication Data
US 2017/0361637 A1    Dec. 21, 2017

(30) Foreign Application Priority Data
Jan. 21, 2015    (JP) .................................. 2015-009660

(51) Int. Cl.
*B41J 2/01*    (2006.01)
*B41M 3/06*    (2006.01)
(Continued)

(52) U.S. Cl.
CPC ............. *B41M 3/06* (2013.01); *B41F 17/007* (2013.01); *B41F 19/002* (2013.01); *B41J 2/01* (2013.01);
(Continued)

(58) Field of Classification Search
CPC .... B41M 7/02; B41M 5/0017; B41M 5/0256; B41M 2205/10; B41F 19/002; B41J 2/0057
See application file for complete search history.

(56) References Cited

U.S. PATENT DOCUMENTS 4,640,878 A * 2/1987 Evans .................... G03C 11/12
430/14
5,098,739 A   3/1992 Sarda
(Continued)

FOREIGN PATENT DOCUMENTS

| JP | 10-45138 A | 2/1998 |
| JP | 2013-000979 A | 1/2013 |
| WO | 2007/066083 A2 | 6/2007 |

*Primary Examiner* — John Zimmermann
(74) *Attorney, Agent, or Firm* — Canon U.S.A. Inc., IP Division

(57) ABSTRACT

The present invention provides a method of forming a pattern that can form a precise pattern on a variety of media by using powders and provides a pattern-producing apparatus.

The method of forming a pattern includes providing a liquid pattern on a surface of a medium, applying a powder to the liquid pattern so as to adhere to the liquid pattern, removing the powdery particles of the powder not adhered to the liquid pattern to give a pattern of the powder, and further applying another powder to the pattern of the powder.

15 Claims, 3 Drawing Sheets

(51) Int. Cl.
    *B41F 19/00*     (2006.01)
    *B41M 3/00*     (2006.01)
    *B41M 7/00*     (2006.01)
    *B41F 17/00*     (2006.01)
    *C09D 11/54*     (2014.01)
    *C09D 11/107*     (2014.01)
    *C09D 11/322*     (2014.01)
    *G03G 15/22*     (2006.01)

(52) U.S. Cl.
    CPC .............. *B41M 3/006* (2013.01); *B41M 7/00* (2013.01); *B41M 7/009* (2013.01); *C09D 11/107* (2013.01); *C09D 11/322* (2013.01); *C09D 11/54* (2013.01); *G03G 15/224* (2013.01)

(56) References Cited

U.S. PATENT DOCUMENTS

| | | |
|---|---|---|
| 5,699,743 A | 12/1997 | Ganz |
| 6,119,598 A * | 9/2000 | Reynolds .............. B41F 23/065 101/488 |
| 2003/0167634 A1 * | 9/2003 | Nakao .................. H01G 4/0085 29/846 |
| 2006/0061641 A1 | 3/2006 | Ueki |
| 2012/0127250 A1 * | 5/2012 | Kanasugi ............... B41J 2/0057 347/103 |

\* cited by examiner

[Fig. 1]
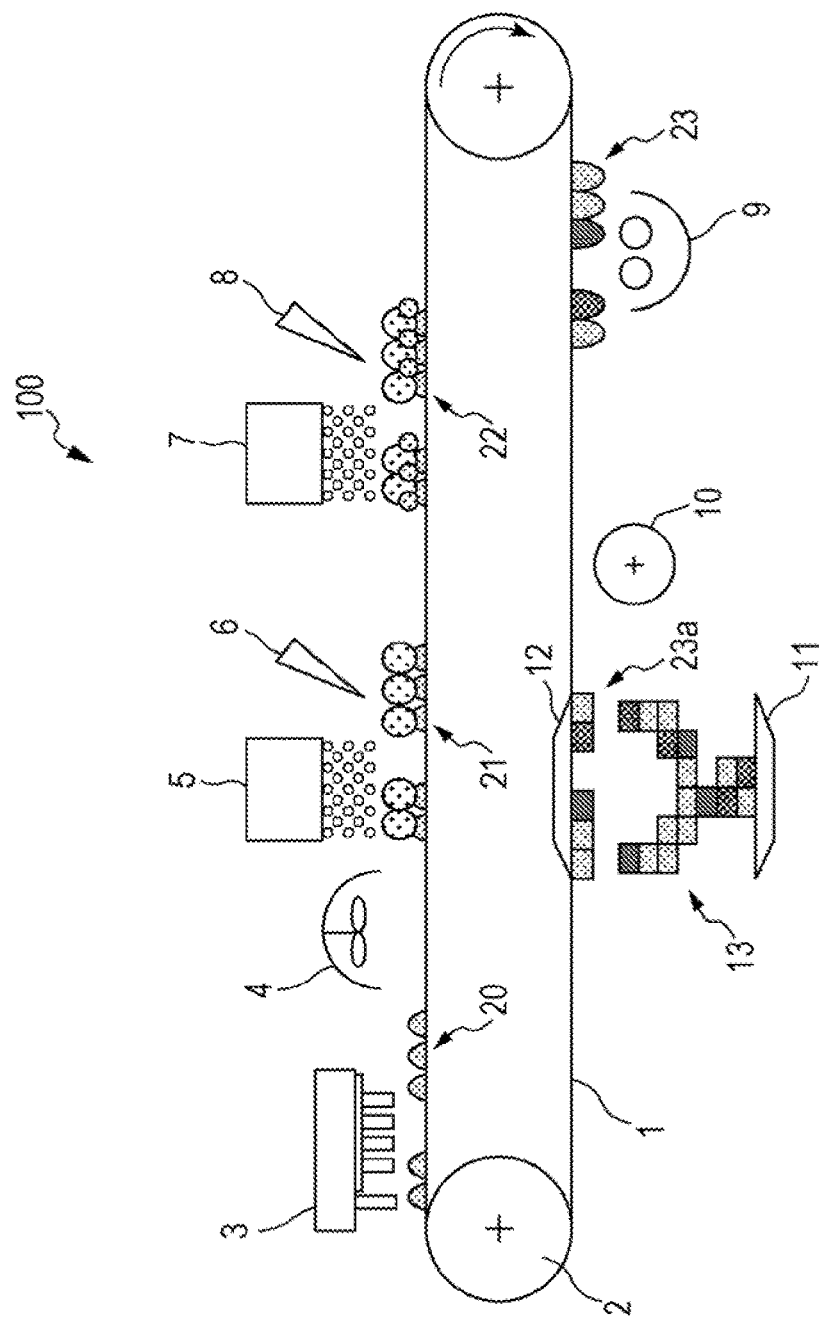

[Fig. 2]
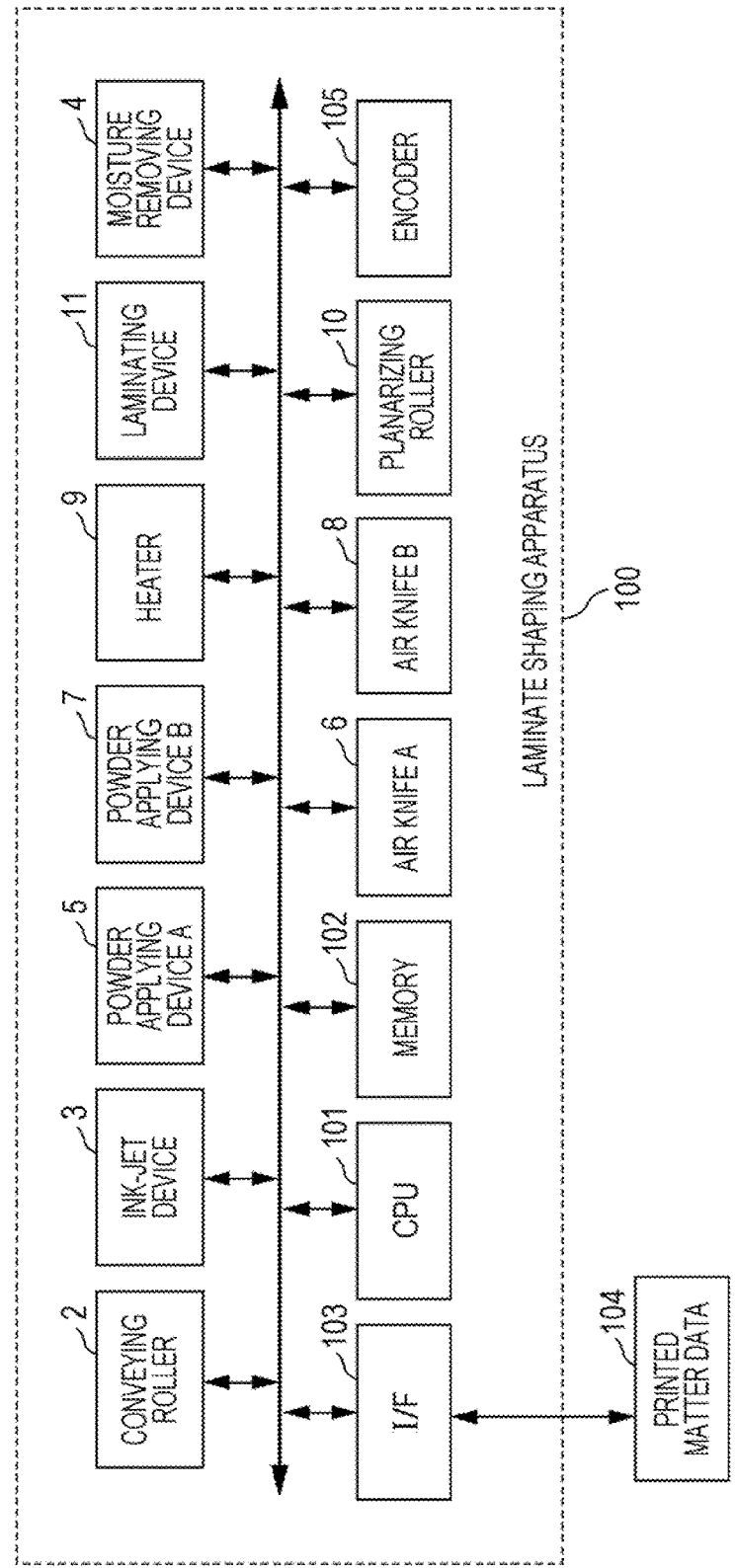

[Fig. 3A]
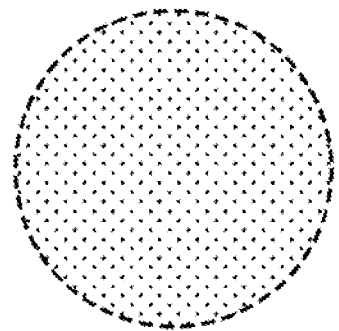
[Fig. 3B]
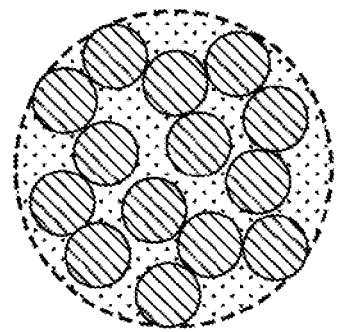
[Fig. 3C]
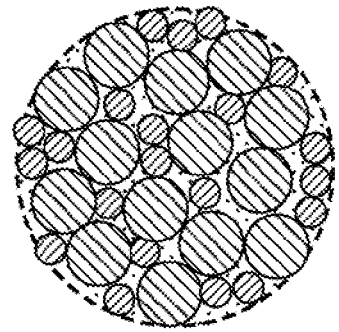

METHOD OF FORMING PATTERN, PATTERN-PRODUCING APPARATUS, AND STEREOSCOPIC OBJECT-PRODUCING APPARATUS

TECHNICAL FIELD

The present invention relates to a method of forming a pattern, a pattern-producing apparatus, and a stereoscopic object-producing apparatus.

BACKGROUND ART

Recently, digital printing techniques have been rapidly spreading. The digital printing does not use any printing plate and therefore can be easily applied to a small amount of production. The digital printing thus copes with the recent short delivery time of a small lot production. Although the digital printing is not inferior to analog printing in the quality of ordinary printed matter, such as photographs and magazines, it still has many problems in thick film printing. Among the problems, a significant problem is the limitation in the ink and recording medium. In thick film printing, the information other than image information to be incorporated into printed matter is huge compared to that in ordinary printed matter. That is, it is important that there are many candidates of the recording medium and the ink (patterning) material. For example, a screen printing technique of the analog thick film printing technique can increase the value of a design by partially thickening a printed image or can print, for example, an electric circuit using an electrically conductive ink. In contrast, in an UV-IJ (ink jet) system and an electrophotographic system of the digital printing that can perform thick film printing, the ink (patterning) materials are strictly limited. In the UV-IJ, the materials are limited to photosensitive resins that can be discharged by IJ. In the electrophotographic system, the materials are limited to resins having specific static electric properties. Methods for increasing the degree of freedom in the ink (patterning) materials for thick film printing have been proposed. For example, in PTL 1, thick film patterns of a relatively variety of materials are prepared as follows: A high-precision thin film pattern of an ink is formed on a recording surface, a resin powder is allowed to adhere onto the ink pattern by means of the adhesion of the ink, and the ink pattern is formed into a coating film by, for example, melting to obtain a thick film pattern.

CITATION LIST

Patent Literature

PTL 1: Japanese Patent Laid-Open No. 10-45138

SUMMARY OF INVENTION

Technical Problem

In the method disclosed in PTL 1, a thermoplastic resin powder adheres to an ink pattern to form a transparent resin layer on the image. Although it is presumed that a thick film pattern can be formed by using a thermoplastic resin having a large particle size, an increase in the particle size causes another problem, a decrease in the resolution of the pattern.

Since the ink image for forming a pattern is of a thin film, the size of the powder constituting the pattern is the dominant factor that determines the film thickness of the pattern. For example, a powder having a large diameter forms a thick film, and a powder having a small diameter forms a thin film. At the same time, however, the diameter of the powder affects the resolution. That is, use of large-diameter particles significantly decreases the resolution compared to use of small-diameter particles.

Accordingly, in order to form a pattern having a high resolution and also a large film thickness, lamination of a plurality of patterns of small-diameter particles is needed. This increase in the number of times of printing for forming a pattern leads to a decrease in productivity. Further, when a structure is shaped by repeating lamination of patterns, lamination must be repeated a large number of times.

The present invention has been made in view of the above-mentioned problems and provides a pattern having an enlarged thickness due to use of powder, while preventing a decrease in the resolution of the pattern.

Solution to Problem

The present invention relates to a method of forming a pattern. The method includes providing a film-like liquid pattern of a liquid on a surface of a medium, applying a first powder having a first particle diameter to the liquid pattern such that the powdery particles of the first powder adhere to the liquid pattern, removing the powdery particles not adhered to the liquid pattern, and further applying a second powder having a second particle diameter that is smaller than that of the first powder to the pattern of the first powder.

Advantageous Effects of Invention

In the present invention, the later applied powdery particles penetrate into the gaps between the previously applied powdery particles to form a pattern of the powdery particles following the image of the liquid pattern. As a result, a pattern having a thickness that is increased by the powdery particles can be formed, while preventing the resolution of the pattern from decreasing.

Further features of the present invention will become apparent from the following description of exemplary embodiments with reference to the attached drawings.

BRIEF DESCRIPTION OF DRAWINGS

FIG. 1 is a schematic diagram illustrating a laminate-shaping apparatus according to an embodiment of the present invention.

FIG. 2 is a block diagram illustrating an example of the control system of the laminate-shaping apparatus shown in FIG. 1.

FIG. 3A is a conceptual diagram illustrating a state of particle adhesion according to an embodiment.

FIG. 3B is a conceptual diagram illustrating a state of particle adhesion according to the embodiment.

FIG. 3C is a conceptual diagram illustrating a state of particle adhesion according to the embodiment.

DESCRIPTION OF EMBODIMENTS

FIG. 1 is a schematic diagram illustrating an example laminate-shaping apparatus 100 that is a stereoscopic object-producing apparatus for implementing a method of forming a stereoscopic object according to an embodiment of the present invention. In this apparatus, a layer of a stereoscopic object is patterned on a belt-like intermediate transfer member 1 (hereinafter referred to as transfer member 1), the layer being formed during passing through each process unit by means of a transfer mechanism, conveying rollers 2; is then transferred to a laminating device 1; and is laminated into a stereoscopic object. The transfer member 1 is used as an intermediate recording medium.

In the apparatus shown in FIG. 1, it is necessary to form a cross-section layer of a shaping object on the surface of the transfer member 1 and to transfer the cross-section layer of the shaping object to a stereoscopic object in the middle of formation. The transfer member 1 can be therefore made of a material having high releasability from the shaping material forming the cross-section pattern of the shaping object. Even if the transfer member does not have releasability, for example, even if the transfer is forcedly performed as in offset printing, the stereoscopic object can be formed. However, the shaping precision decreases. The shaping material on the transfer member therefore should be completely transferred.

In order to stably perform the transfer, the transfer member 1 should at least have elasticity. Examples of the material of the transfer member 1 include silicone rubber and fluororubber. Since these materials repel some of the shaping materials used for patterning, the materials may be surface-treated prior to the use as the transfer member 1. Although the degree of rubber hardness varies depending on the thickness of the elastic body, a thick transfer member should be made of a hard rubber, and a thin transfer member should be made of a soft rubber. For example, a thick member can be made of a rubber having a rubber hardness of about 80 degrees. A thin belt-like transfer member 1 as in the apparatus shown in FIG. 1 can be a thin film having a thickness of about 0.1 to 0.5 mm made of a soft rubber having a rubber hardness of about 20 to 50 degrees. When a high precision is needed, a non-elastic material, such as a Teflon (registered trademark) sheet or a smooth film coated with a release agent in a submicron thickness, can be used. When a non-elastic transfer member is used, in order to uniformly press the recording medium and the entire surface of the transfer member, the apparatus and members must have high dimensional accuracy and must be highly controlled. Accordingly, the material should be selected depending on the purpose.

When the shaping material is a metal powder, the transfer member 1 can be surface-treated with a release agent, such as boron nitride having high heat resistance.

A lamination step performed by the laminate-shaping apparatus will now be described.

In the apparatus shown in FIG. 1, a liquid color ink is discharged from an ink-jet device 3 onto a transfer member 1 to form an ink pattern 20 as a film-like liquid pattern on the transfer member 1. In this case, although the ink pattern is formed with the ink-jet device 3 as an example, the ink pattern may be formed by any process. For example, a method using a plate, such as a flexo plate, may be employed. Even in formation of a stereoscopic object, for example, a plurality of hierarchies of shape patterns are printed in a plate by simultaneous printing, and layers of these shape patterns can be continuously laminated.

Patterning by an ink-jet method can arbitrarily pattern a liquid and is therefore particularly effective. The ink-jet method may be of any system, basically, any system that can discharge a liquid, such as thermal-type, piezo-type, static electricity-type, and continuous-type systems. Regarding the number of nozzles, the system may be of a one nozzle-type (including a dispenser) or a line head-type having a large number of nozzles. In the aspect of productivity, the line head can be used.

The ink material may be any material that allows adhesion of the powder described below and may be an aqueous ink or an oil ink. Since the ink pattern should be sufficiently reduced in thickness prior to the application of a powder, aqueous inks that can contain large amounts of highly safe volatile components can be used.

When the later-applied powder is of plastic, since many of plastic materials have lipophilic surfaces and some of them have low compatibility with aqueous inks, for example, a water-soluble organic solvent or a surfactant may be added to the ink for increasing the compatibility.

The affinity to the powder can be increased by evaporating the water in the applied aqueous ink containing a water-soluble organic solvent or a surfactant to increase the ratio of the water-soluble organic solvent in the ink.

Any water-soluble organic solvent may be added to the ink. The organic solvent can be selected such that the characteristics, such as surface tension, drying properties, and viscosity, are suitable for the materials to be used. Examples of the water-soluble organic solvent include amides such as dimethylformamide and dimethylacetamide; ketones such as acetone; ethers such as tetrahydrofuran and dioxane; polyalkylene glycols such as polyethylene glycol and polypropylene glycol; alkylene glycols such as ethylene glycol, propylene glycol, butylene glycol, triethylene glycol, 1,2,6-hexanetriol, thiodiglycol, hexylene glycol, and diethylene glycol; lower alkyl ethers of polyols such as ethylene glycol methyl ether, diethylene glycol monomethyl ether, and triethylene glycol monomethyl ether; monovalent alcohols such as ethanol, isopropyl alcohol, n-butyl alcohol, and isobutyl alcohol; and other solvents such as glycerin, N-methyl-2-pyrrolidone, 1,3-dimethyl-imidazolidinone, triethanolamine, sulfolane, and dimethyl sulfoxide.

Examples of the surfactant include fluorosurfactants, silicone surfactants, and water-soluble anionic surfactants, cationic surfactants, nonionic surfactants, and amphoteric surfactants.

When the image-forming surface is the transfer member, since the transfer member may readily repel an ink, use of a reaction solution that reduces the fluidity of a solution mixture of the ink and the reaction solution through a catalytic reaction with the ink is also useful. The type of the reaction and the reaction material of the reaction solution can be selected depending on the combination with the ink according to the purpose. For example, in an aqueous ink that can be used as an ink-jet ink, for example, aggregation, gelation, salt precipitation, and acid-base reactions can be used alone or in combination. In particular, an aggregation reaction can be employed, and a combination of a pigment ink and a metal salt as the reaction material can reduce the total amount of the binders and can reduce the thickness of the ink film to give a high image quality and can also achieve a high reaction rate to increase the productivity.

The reaction material is, for example, an ionic material having the polarity opposite to that of the ink. Ordinary ink-jet inks are anionic. The reaction solution for such an ink can be an aqueous metal salt solution. In particular, an aqueous polyvalent metal salt solution can be used. The polyvalent metal salt is composed of a polyvalent metal ion and an anion binding to the polyvalent metal ion. Examples of the polyvalent metal ion include divalent metal ions such as $Ca^{2+}$, $Cu^{2+}$, $Ni^{2+}$, $Mg^{2+}$, and $Zn^{2+}$; and trivalent metal ions such as $Fe^{3+}$ and $Al^{3+}$. Examples of the anion binding to these metal ions include $Cl^-$, $NO_3^-$, $SO_4^{2-}$, $I^-$, $Br^-$, $ClO_3^-$, and $RCOO^-$ (R represents an alkyl group).

The combination use of these metal salts and acids can further enhance the reactivity. The acids easily react with the basic component contained in the ink and may therefore be used alone.

In particular, the acid can be an organic acid. Examples of the organic acid include oxalic acid, polyacrylic acid, formic acid, acetic acid, propionic acid, malonic acid, malic acid, maleic acid, ascorbic acid, succinic acid, glutaric acid, glutamic acid, fumaric acid, citric acid, tartaric acid, lactic acid, pyrrolidone carboxylic acid, pylon carboxylic acid, pyrrolye carboxylic acid, furan carboxylic acid, pyridine carboxylic acid, coumalic acid, thiophene carboxylic acid, nicotinic acid, oxysuccinic acid, and dioxysuccinic acid.

Although the ink composition may contain a solid, a decrease in the content of the solid in the ink can increase the ratio of powdery particles in an image film. For example, in formation of a stereoscopic object according to the embodiment, an increase in the ratio of the later applied powder can increase the strength and the recycling efficiency after the use.

Subsequently, the volatile component in the provided ink pattern 20 is volatilized with a moisture removing device 4 to remove at least a part of the solvent component and reduce the film thickness of the ink pattern 20. When the film thickness of the final pattern is controlled by disposing powdery particles, the powdery particles should form a monolayer. If the ink thickness is large, the ink may come around the top surfaces of the applied particles, and the particles may lap over and adhere to other particles. As a result, the amount of the adhering powdery particles becomes uneven, leading to deterioration of the beauty of the formed pattern. When a stereoscopic object is formed by laminating layers of thick film patterns, the error in the thickness of the image causes a distortion in the stereoscopic object, resulting in more significant expression of the phenomenon. The film thickness of the ink pattern 20 should be reduced as much as possible, prior to the application of a powder, as long as the adhesiveness to the powder is maintained. This step can be omitted or lessened if the original ink thickness before the application of a powder is small. For example, it is also possible to form a pattern with an ink in a minimum amount necessary for adhesion of a powder, form a powder pattern, and then additionally apply the ink to fill the shortage of the ink. For example, when the ink-jet device 3 can discharge a plurality of inks having different colors for color printing, the amount of inks applied to a secondary color or tertiary color portion is considerably larger than that of the ink applied to a monochrome portion. In such a case, powder patterning is performed with a monochrome ink, and then a color ink may be additionally applied to the resulting powder pattern.

Subsequently, a powder is applied to the resulting ink pattern. The present invention is characterized by the sequential use of a plurality of powders having different particle diameters. The apparatus shown in FIG. 1 has a structure using two different powders. Although any number of powders may be used, in general, about two stages can sufficiently improve the quality in many cases. The particle diameter distribution of a powder should be narrow as much as possible.

In the present invention, powders are applied in the descending order of the particle diameter. Accordingly, the previously applied powder has a larger particle diameter (large-diameter particles).

The apparatus shown in FIG. 1 supplies large-diameter particles with a powder applying device (A) 5 and removes large-diameter particles not adhered to the ink pattern, for example, the large-diameter particles outside the ink pattern, with an air knife (A) 6 to allow only the large-diameter particles applied to the portion corresponding to the ink pattern to remain on the transfer member by means of the adhesion of the ink. A pattern of the large-diameter particles is thus formed. The thus-formed pattern indicated by reference No. 21 is referred to as powder A pattern.

The gravity and external force (such as the blow from the air knife) applied to the large-diameter particles are larger than those applied to small-diameter particles, leading to a lower adhesion density of the large-diameter particles.

Subsequently, as in the large-diameter particles, a powder (small-diameter particles) having a particle diameter smaller than that of the large-diameter particles is applied onto the previously formed powder A pattern 21 with a powder applying device (B) 7. Although the powder A pattern 21 already contains the adhering large-diameter particles, the small-diameter particles penetrate into the gaps between the large-diameter particles and partially reach the surface of the ink and are fixed by means of the adhesion of the ink.

As in the large-diameter particles, the small-diameter particles outside the powder A pattern 21 or the small-diameter particles not sufficiently adhered to the ink are removed from the surface of the transfer member 1 with an air knife (B). The thus-prepared powder pattern is the powder AB pattern indicated by reference No. 22 in FIG. 1.

FIG. 3A is a diagram schematically illustrating an ink pattern 20; FIG. 3B schematically illustrates a state after patterning of large-diameter particles on the ink pattern 20; and FIG. 3C schematically illustrates a state after patterning of small-diameter particles.

The mixture pattern shown in FIG. 3C, as obvious from the drawing, more precisely corresponds to the ink pattern 20, compared to patterning with the large-diameter particles only, and can form a film having a thickness larger than that of a film formed of the small-diameter particles only. If the ink has a high fluidity, the adhering previously applied large-diameter particles may draw the ink near the large-diameter particles to weaken the adhesion of the later applied small-diameter particles. In such a case, as described above, the use of a reaction solution is effective for reducing the fluidity of the ink. As a result, the fluidity of the ink in an ink pattern is reduced to prevent the ink from being drawn toward the large-diameter particles.

The advantageous effects of the process of stepwise applying large-diameter particles and small-diameter particles in a plurality of times will now be described.

If a powder mixture of large-diameter particles and small-diameter particles is used, a condition, such as the Brazil nut phenomenon, is observed, and the small-diameter particles preferentially adhere to the ink pattern. In addition, since the adhesion of the large-diameter particles adhered to the ink pattern is lower than that of the small-diameter particles, many of the large-diameter particles are detached from the ink pattern in the step of removing the particles not adhered to the ink, in many cases, resulting in absence of the particles in this portion.

Even if the small-diameter particles and the large-diameter particles are separately applied, when the application of the small-diameter particles is prior to the application of the large-diameter particles, the small-diameter particles cover almost the entire ink pattern to prevent the large-diameter particles from sufficiently adhering, resulting in a difficulty in provision of a desired film thickness.

As described above, in the embodiment, large-diameter particles and small-diameter particles are stepwise applied in this order to an ink pattern to prevent the above-described problems, and thereby a pattern having a high resolution and a relatively large thickness can be formed.

The sizes of the large-diameter particles and the small-diameter particles will be described. The later applied small-diameter particles can penetrate into the gaps between the large-diameter particles adhered to the ink pattern. The optimum diameter varies depending on the material and the application density. From the above-described viewpoint, the radius of the small-diameter particles is preferably 50% or less, more preferably 30% or less, of the radius of the large-diameter particles. Although the pattern precision increases with a decrease in the particle diameter of the powder having the smallest diameter, the decrease in the particle diameter reduces the contribution to an increase in the film thickness.

The powder applying devices (A) and (B) shown in FIG. 1 each have a mechanism for uniformly sprinkling a powder in a shower state over the entire ink pattern 20. The mechanism is not limited to this example, and a variety of mechanisms can be employed. For example, a process of spreading a powder on a surface with a squeegee or a process of blowing a powder with a wind pressure can be employed. The powdery particles outside the ink pattern 20 can be removed with any device, such as a device utilizing vibration or suction, without being limited to the use of the air knife shown as an example. The methods of applying particles and of removing particles should be selected depending on the type and the characteristics of the particles used. For some kinds of powders, a system for blowing a powder with a wind pressure can simultaneously perform the application of powdery particles and the removal of the powdery particles not adhered to an ink pattern.

In the present invention, since the fixation of powdery particles to an ink pattern is achieved with the adhesion of the liquid, the material of the powdery particles can be selected from a variety of materials and may be any material that can be formed into particles. In order to ultimately melt and unify the applied particles, the material can be a thermoplastic resin. Examples of the thermoplastic resin include polyethylene, polypropylene, nylon, ABS, polylactic acid, polystyrene, poly(vinyl chloride), poly(methyl methacrylate), polytetrafluoroethylene, ionomers, and EVA. Other examples of the material include those that can be heated, molten, and molded, such as metals, glass, and ceramics. The powdery particles may be surface-treated for enhancing the adhesion and color developing properties of the ink and assisting the fixation between particles. The particles may have any shape and can be spherical from the point of view of ease in adhesion to an image portion and ease in removal from the non-image portion.

Furthermore, particles (not shown) smaller than the small-diameter particles may be further applied to the resulting powder AB pattern.

Subsequently, the powder AB pattern 22 formed on the belt-like transfer member 1 is transferred to the position of a heater 9. The heater 9 emits heat rays toward the powder AB pattern 22 to melt the powdery particles to form the powder AB pattern 22 into a coating film. A fusion pattern 23 is thus prepared. The heating may be performed by any hearing system, and the system may be of a contact type, such as a heat roller, or of a non-contact type, such as irradiation of IR or microwaves. Alternatively, heating may be performed by scanning energy rays, such as laser light, or a heater 9 disposed on the rear surface of the transfer member 1 may heat a fusion pattern through the transfer member 1.

The coating film may be also formed by adding a photosetting component, such as an ultraviolet curable component, to the material forming the powder AB pattern 22 in advance and photocuring the powder AB pattern 22. The ink for patterning a powder may be a UV ink. A UV curable material may be added to the powder after patterning. In such a case, the powder AB pattern 22 may be cured by irradiation with light in a state being in contact with the surface to which the powder AB pattern 22 is transferred. Consequently, the curing and the transfer of the cured powder AB pattern can be simultaneously performed.

The surface of the fusion pattern 23 that is the coating film formed from the powder AB pattern 22 is planarized with a planarizing roller 10 and is then transferred to the position to face the laminating device 11. The fusion pattern 23 is positioned relative to the laminating device 11 and is then united to the structure 13 in the middle of formation. In this apparatus, the laminating device 11 moves upwards, and the fusion pattern 23 can receive the pressing force from the laminating device side by the presence of a back plate 12 on the rear side of the transfer member 1. The cross-section layer 23a of the structure formed from the fusion pattern 23 having the planarized surface is brought into contact with the structure 13 in the middle of formation, followed by cooling to allow the fusion pattern 23 to adhere to the structure 13 in the middle of formation. The fusion pattern 23 may be cured in advance by cooling and may be then bonded to the structure 13 in the middle of formation with an adhesive, for example.

When an overhang shape (not shown in FIG. 1) is formed by a laminate shaping method, in general, a supporting member called support is temporarily needed and should be appropriately produced according to the materials used and the purpose of the target stereoscopic structure. In such a case, a support material supplying device is provided to the laminate-shaping apparatus 100, and a support material for forming a support member that supports the structure in the middle of formation is supplied from the support material supplying device (not shown).

The process from the formation of an ink pattern 20 until the lamination of a cross-section layer 23a to a structure described above is repeated for the number of times determined in advance to form a stereoscopic structure.

FIG. 1 shows an example apparatus that forms a thick film pattern as a cross-section layer 23a of a structure and laminates the layer to produce a structure. The apparatus is not limited thereto.

For example, a thick film can be formed by direct printing on a recording medium, without using the transfer member 1. It is possible to perform stereoscopic decoration of standard characteristics or images; incorporation of additional information, as in braille or forgery prevention; and formation of an electric circuit by using a powder of a low-melting point metal, such as solder. Some materials may remain as powdery layers in final products, such as stereoscopic objects, without melting the powder AB pattern.

In the embodiment described above, shape patterning is performed using not only a powder as a material for forming a thick film, but also an ink pattern 20. Accordingly, the powder itself is not required to have particular patterning characteristics, and the shape patterning can be therefore performed with a low cost compared to the system of directly patterning a thick film material.

FIG. 2 is a diagram illustrating an example of the control system of the laminate-shaping apparatus shown in FIG. 1. In the laminate-shaping apparatus 100, reference No. 100 indicates the whole apparatus; reference No. 101 indicates a CPU performing main control of the entire system and controlling each unit; reference No. 102 indicates a memory including a ROM storing the basic program of the CPU and a RAM storing the printed matter data 104 input from an interface 103 and being used in work for data processing.

The CPU 101 received a signal of starting printing converts the signal into slice data for actually patterning a stereoscopic shape of a structure to be formed, acquired according to the established conditions, or printed matter data 104 showing the target final pattern. Furthermore, the information, such as shape and coloring information, among the slice data is sent to a first ink-jet device 3. At the same time, communication for verifying the conditions of the conveying roller 2, the moisture removing device 4, the powder applying device (A) 5, the air knife (A) 6, the powder applying device (B) 7, the air knife (B) 8, the heater 9, the planarizing roller 10, and the laminating device 11 is performed. After confirmation that printing is possible, a transfer member 1 is transferred with the conveying roller 2. The transfer member 1 is positioned according to the signal of the encoder 105. A predetermined operation is performed by the ink-jet device 3, the moisture removing device 4, the powder applying device (A) 5, the air knife (A) 6, the powder applying device (B) 7, the air knife (B) 8, the heater 9, the planarizing roller 10, and the laminating device 11. The operation is repeated for the predetermined number of times to accomplish the formation of a stereoscopic object.

EXAMPLES

The present invention will now be specifically described by examples.

Example 1

A conical stereoscopic object was laminate-shaped with the apparatus shown in FIG. 1.

The data about the shaping object is converted into slice data at arbitrary layer intervals in advance. In Example 1, slice data were used at 100-micrometer intervals.

The transfer member used was a 0.1-mm Invar film provided with polyimide tape (manufactured by 3M Company, trade name: 5419) on the surface.

Subsequently, the ink-jet device 3 applied an ink and a reaction solution (formula is shown below) having an effect of reducing the fluidity of the ink to the position corresponding to the cross-section pattern to be formed to form an ink pattern 20.

Formula of Reaction Solution
  Calcium nitrate tetrahydrate: 50 parts by mass
  Surfactant (manufactured by Kawaken Fine Chemicals Co., Ltd., trade name: Acetylenol EH): 1 part by mass
  Diethylene glycol: 9 parts by mass
  Pure water: 40 parts by mass
Ink Composition
  Pigment (shown below): 3 parts by mass
  Black: carbon black (manufactured by Mitsubishi Chemical Corp., trade name: MCF88)
  Cyan: Pigment Blue 15
  Magenta: Pigment Red 7
  Yellow: Pigment Yellow 74
  Styrene-acrylic acid-ethyl acrylate copolymer (acid value: 240, weight-average molecular weight: 5000): 1 part by mass
  Glycerin: 10 parts by mass
  Ethylene glycol: 5 parts by mass
  Surfactant (manufactured by Kawaken Fine Chemicals Co., Ltd., trade name: Acetylenol EH): 1 part by mass
  Pure water: 80 parts by mass Subsequently, the moisture removing device 4 blew hot air of 50 degrees Celsius to the ink pattern 20 for about 5 sec to reduce the film thickness of the ink pattern 20.

Subsequently, a powder of large-diameter polypropylene particles (average particle diameter: 100 micrometers) were applied in a shower state to the ink pattern 20 on the transfer member 1.

Subsequently, the air knife nozzle intermittently sprayed destaticizing air (original pressure: 0.25 Pa) to remove the particles outside the ink pattern 20. A powder A pattern was thus prepared.

Subsequently, a powder of small-diameter polypropylene particles (average particle diameter: 50 micrometers) were applied in a shower state to the ink image, to which the large-diameter particles adhered, on the transfer member 1.

Subsequently, the air knife nozzle intermittently sprayed destaticizing air (original pressure: 0.25 Pa) to remove the particles outside the ink pattern 20. A powder AB pattern was thus prepared.

Subsequently, the heater heated the powder AB pattern from the rear surface of the transfer member 1 to melt the pattern at about 170 degrees Celsius into a film of a colored fusion pattern 23. The fusion pattern had a film thickness of about 45.2 micrometers.

Subsequently, the film of the fusion pattern 23 was planarized with the planarizing roller 10 during the process of transferring the fusion pattern 23 to the position of the laminating device 11 and was positioned. The laminating device 11 ascended to the position giving a gap of 44 micrometers between the shaping table of the laminating device 11 and the surface of the transfer member to bring the cross-section layer 23a prepared by the planarization into contact with the surface of the laminating device 11.

This procedure was repeated to sequentially laminate layers on the structure 13, composed of the laminated layers, in the middle of formation. The procedure was repeated 2215 times in total to produce a stereoscopic structure having a height of 10 cm.

The thus-produced structure had a very smooth surface.

Examples 2 to 4

Stereoscopic objects were shaped as in Example 1 except that the small-diameter polypropylene particles differed in the average particle diameter. The film thickness of the fusion pattern and the number of times of lamination necessary for producing the stereoscopic object having a height of 10 cm in each Example are shown below.

In Example 2, small-diameter polypropylene particles (average particle diameter: 70 micrometers) were used. The film thickness of the fusion pattern was 46.4 micrometers, and the number of times of lamination was 2160.

In Example 3, small-diameter polypropylene particles (average particle diameter: 30 micrometers) were used. The film thickness of the fusion pattern was 44.8 micrometers, and the number of times of lamination was 2240.

In Example 4, small-diameter polypropylene particles (average particle diameter: 20 micrometers) were used. The film thickness of the fusion pattern was 45.0 micrometers, and the number of times of lamination was 2230.

The stereoscopic structures produced in Examples 2 to 4 had very smooth surfaces.

Comparative Example

A stereoscopic object was shaped as in Example 1 except that the fusion pattern was formed with large-diameter polypropylene particles (average particle diameter: 100 micrometers) only, without using small-diameter polypropylene particles. The film thickness of the fusion pattern of Comparative Example was 43.9 micrometers, and the number of times of lamination was 2280. The resulting stereoscopic structure had a surface exhibiting feeling of irregularity, and the surface was rough to the touch.

The difference in the smoothness between the surfaces of the structures of Examples and Comparative Example is believed to be caused by the difference in resolution of the outlines of the fusion patterns. As described above, the use of powders having different, large and small, diameters allows a pattern to be formed with a high resolution, while increasing the film thickness of the pattern, to shape a high-precision stereoscopic structure. In addition, the comparison between Examples suggests that the small-diameter particles having a particle diameter being 50% or more and 70% or less than that of the large-diameter particles highly distribute to an increase in the film thickness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-009660, filed Jan. 21, 2015, which is hereby incorporated by reference herein in its entirety.

The invention claimed is:

1. A method of forming a pattern, the method comprising:
providing a film-like liquid pattern of a liquid on a surface of a medium;
applying a first powder having a first particle diameter to the liquid pattern such that the powdery particles of the first powder adhere to the liquid pattern;
removing the powdery particles not adhered to the liquid pattern; and
applying a second powder having a second particle diameter that is equal to or smaller than 30% of the first particle diameter to the pattern of the first powder.

2. The method of forming a pattern according to claim 1, wherein the first powder is applied to the liquid pattern by sprinkling the powder over the entire film-like liquid pattern.

3. The method of forming a pattern according to claim 2, wherein the powdery particles of the first powder and the powdery particles of the second powder are spherical; and the second powder has a radius that is equal to or less than a half of the radius of the first powder.

4. The method of forming a pattern according to claim 1, wherein the liquid pattern is provided by applying the liquid to the medium by an ink-jet method.

5. The method of forming a pattern according to claim 1, wherein the liquid pattern is formed of an ink and a reaction solution for reducing the fluidity of the ink.

6. The method of forming a pattern according to claim 5, wherein the ink is a pigment ink; and the reaction solution contains a metal salt reacting with the pigment ink.

7. The method of forming a pattern according to claim 1, wherein at least one of the first powder and the second powder contains a thermoplastic resin; and the method further comprises heating and melting the pattern prepared by applying the first and second powders.

8. The method of forming a pattern according to claim 1, wherein the application of the first powder to the liquid pattern and the subsequent removal of the powdery particles not adhered to the liquid pattern are repeated two or more times.

9. The method of forming a pattern according to claim 1, wherein the powdery particles of the first powder not adhered to the liquid pattern are removed by blowing air to the powdery particles not adhered to the liquid pattern.

10. A pattern-producing apparatus comprising:
a provision unit configured to provide a film-like liquid pattern on a surface of a medium;
a first application unit configured to apply a first powder having a first particle diameter and allowing the first powder to adhere to the liquid pattern;
a second application unit configured to apply a second powder having a second particle diameter that is equal to or smaller than 30% of the first particle diameter and allowing the second powder to adhere to the liquid pattern; and
a removal unit configured to remove the powdery particles not adhere to the liquid pattern, wherein
the powdery particles of the first powder applied by the first application unit and not adhered to the liquid pattern are removed by the removal unit to form a pattern of the first powder; and
the second application unit applies the second powder to the pattern of the first powder.

11. The pattern-producing apparatus according to claim 10, wherein the first application unit applies the first powder to the film-like liquid pattern by sprinkling the first powder over the entire film-like liquid pattern.

12. The pattern-producing apparatus according to claim 10, wherein the powdery particles of the first powder and the powdery particles of the second powder are spherical; and the second powder has a radius that is equal to or less than a half of the radius of the first powder.

13. A stereoscopic object-producing apparatus comprising:
a provision unit configured to provide a film-like liquid pattern on a surface of a transfer member;
a first application unit configured to apply a first powder having a first particle diameter and allowing the first powder to adhere to the liquid pattern;
a second application unit configured to apply a second powder having a second particle diameter that is equal to or smaller than 30% of the first particle diameter and allowing the second powder to adhere to the liquid pattern;
a removal unit configured to remove the powdery particles not adhere to the liquid pattern; and
a transfer unit configured to transfer a layer formed of the powders and the liquid pattern on the surface of the transfer member to a stereoscopic object in the middle of formation, wherein
the powdery particles of the first powder applied by the first application unit and not adhered to the liquid pattern are removed by the removal unit to form a pattern of the first powder; and
the second application unit applies the second powder to the pattern of the first powder.

14. The stereoscopic object-producing apparatus according to claim 13, wherein the powdery particles of the first powder and the powdery particles of the second powder are spherical; and the second powder has a radius that is equal to or less than a half of the radius of the first powder.

15. The stereoscopic object-producing apparatus according to claim 13, wherein the first powder is applied to the liquid pattern by sprinkling the powder over the entire film-like liquid pattern.

* * * * *